Sheet 1-3 Sheets.
8162X
F. Fossard.
Making Prussiate of Potash.
Patented Apr. 23, 1834.
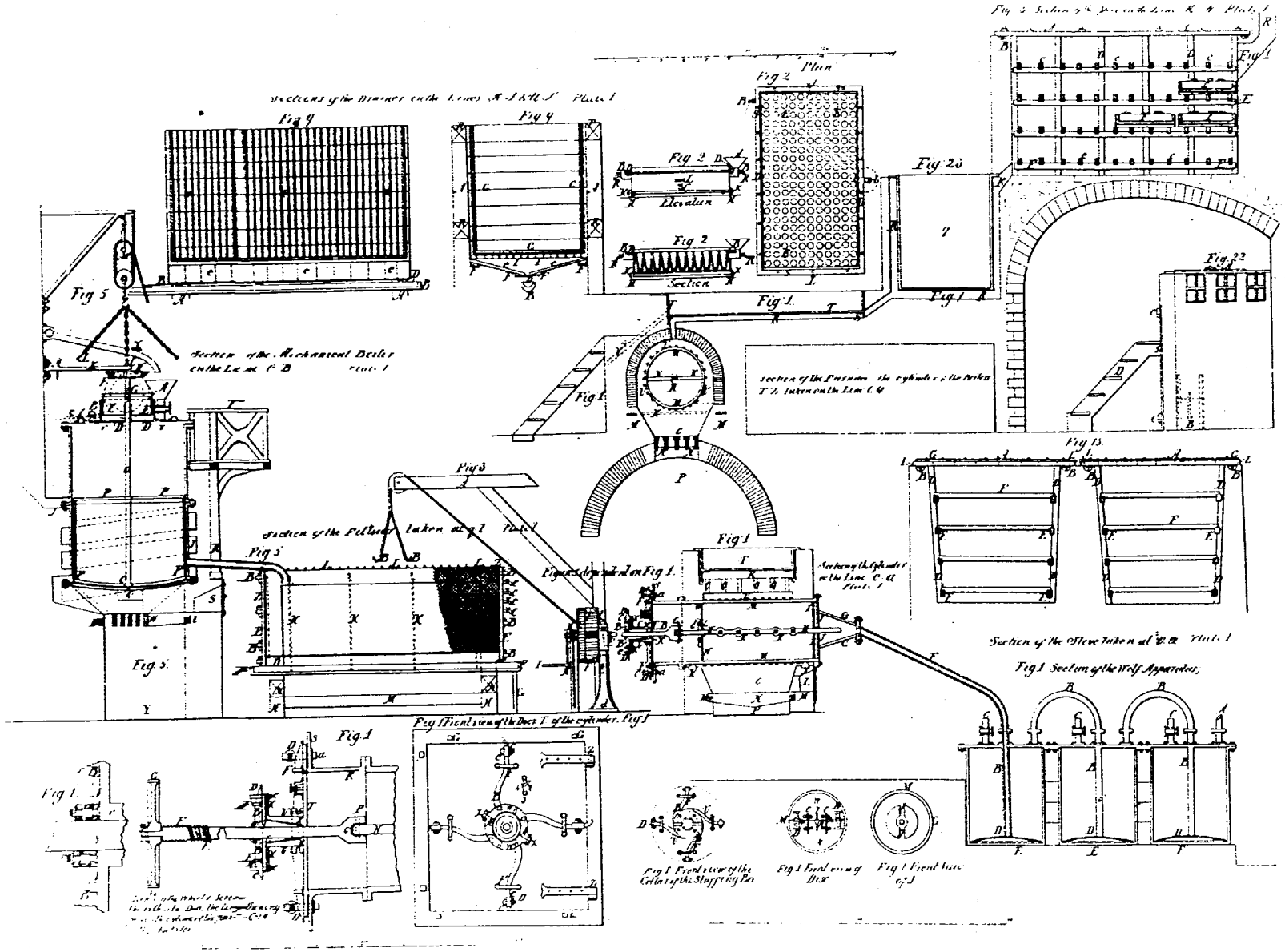

8162X
Sheet 2-3 Sheets
F. Fossard.
Making Prussiate of Potash.
Patented Apr. 23, 1834.
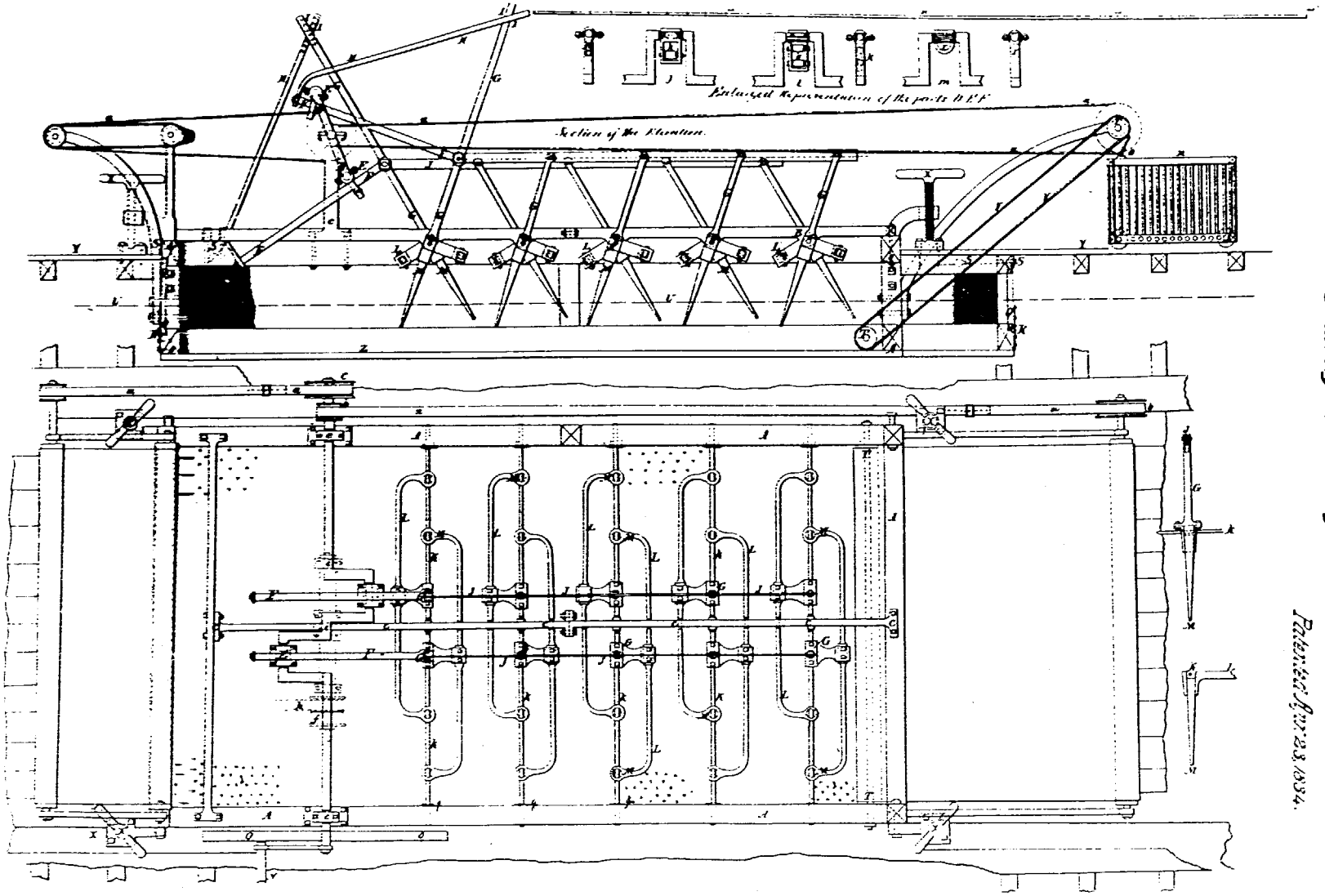

8162x
Sheet 1 - 3 Sheets.
F. Fossard.
Making Prussiate of Potash.
Patented Apr. 23, 1834.
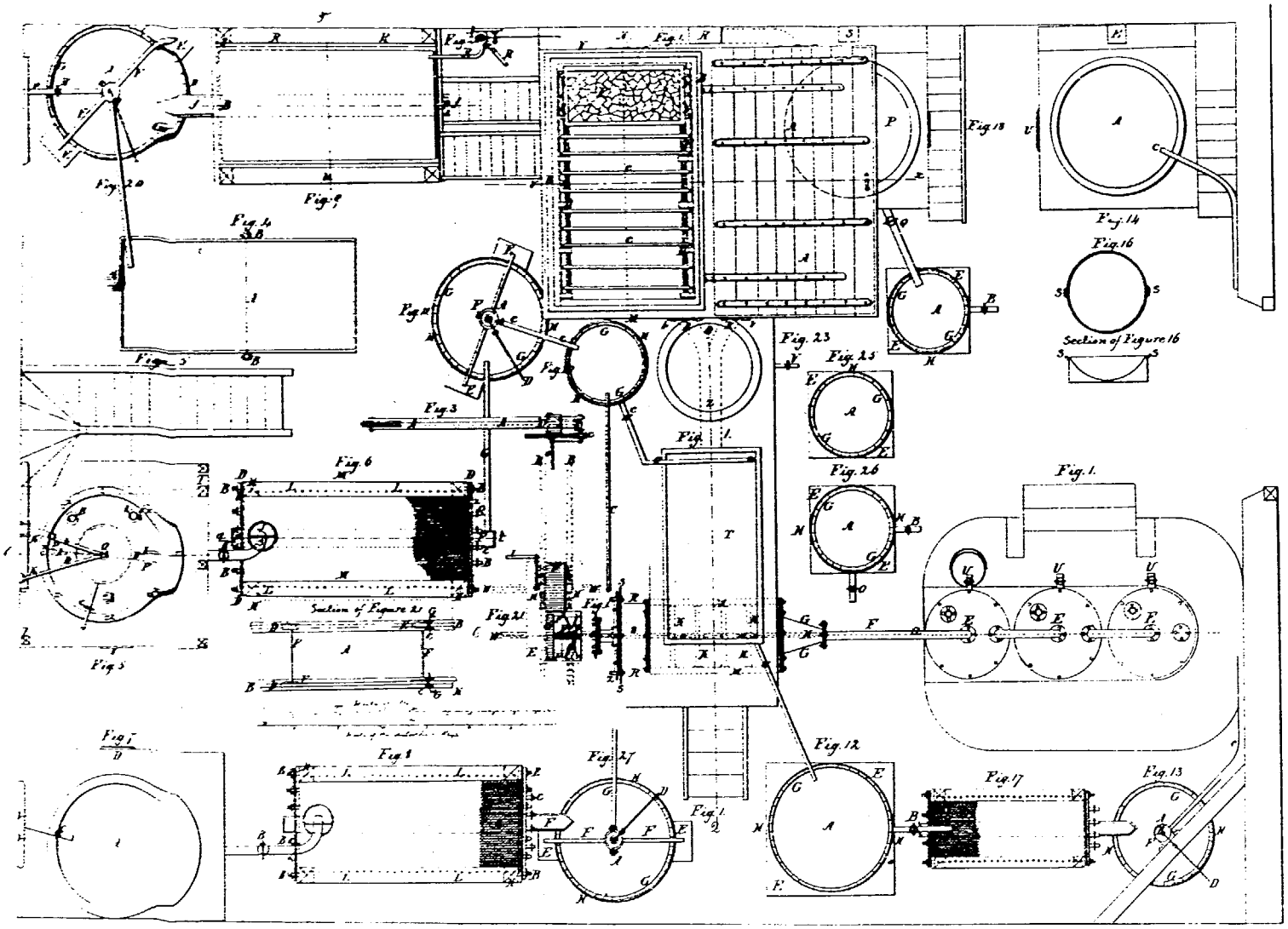

4/23/1834 8162X

Felix Fouvard

Letters Patent

The Schedule referred to in these Letters Patent and making part of the same containing a description in the words of the said Felix Fouvard himself of his improvement in the machine or closed vessel for manufacturing the prussiates of Potash and Soda; and also certain machinery, apparatus and utensils, to be used in the said manufacture, and in the scouring, dyeing and washing of Wool, in the fleece, flock, skein, piece blanket, or otherwise, also in the dyeing of Silk, cotton, linen and other textile or organic substances.

The principle articles on which my claims are founded. 1st On the construction of a closed vessel (and its employment) as well as certain apparatus, methods and processes for manufacturing the prussiates of pot ash and of Soda. That vessel bearing a cylindrical or any other form, placed horizontally or vertically, revolving on itself or being steady and the materials being stirred into it by machinery or without it.

2nd On the importance of passing wool or the cloth, blanket &c. into an acid bath, in order of scouring it thoroughly and on the general advantages arising from the use of this bath, not only for woollens intended to be dyed by the prussiate of iron, but also for all kinds of woollen materials, whether intended to be dyed by the ordinary processes or not.

3rd On the means of producing upon textile substances an uniform oxygenation of the protoxide and deutoxide of iron, or an oxide more oxygenated, by means of a current of air heated and blown upon them by means of a bellows in a particular apparatus.

4th On the means of fixing the prussiate of copper by previous fixation of the oxide. 5th on the means of obtaining black, Bronze and a great many other colors with or without a blue tint by saturating and combining the oxide of iron with almost all the colouring materials known. The blue tint when desired being given by prussic acid or indigo indigo being even employed before, during, or after the saturation of the oxide of iron by means of prussic acid, in materials

8162X intended for blue to give them a peculiar shade. The baths of oxide of
iron of prussic acid and other coloring substances being used below or
at boiling heat. 6th On the method of expressing the liquid from the
cloths &c. as they pass out of the baths, by means of pressing rollers
or peculiar flexible cylinders.

7th On the employment of a clothed stove to expel the humid-
ity from the cloth &c. 8th On the adaptation of various systems
of winches, eccentrics, bevels &c to the construction and employment of
a machine for washing wool. and on the employment of certain Cranes
apparatus and utensils. and their arrangement as a means of perform-
ing the general and particular processes for which they are intended, not
only in treating woollens and other materials to be dyed by the prussiate
of iron but also every kind of materials in any dye house.

9th On the principles the characters, the effects, and consequent re-
sults of the preceding articles, either combined with the means and
processes of the patent granted me under the date of the fourteenth day
December 1832 or not. and either used in the whole or in part in
the manufacture or the dye house.

Many of the things which are represented in the drawings
enrolled with this specification, and described in the various processes
are not strictly speaking my invention, but I claim them only as
respects the practical and special application to which I adapt them.
in the processes of washing, scouring, dyeing and manufacturing Processes of manufacturing the prussiates.

The different vessels and apparatus described in plates 1st & 2nd being
erected and placed in a place sufficiently large. Heat the cast
iron cylinder M Figure 1. to a low red heat as it has been pre-
viously described in the specification of my patent of December 1832
place the front disk I and its pin on the fore part H. of the axis of the agi-
tator, bend the pin a little after having introduced it into the holes
of the collar of the disk and the agitator see the plates and descrip-
tion of them deposited in the Patent Office Place the agitator in the cylinder so that the round pointed end

8162X

H rests about a foot on the support J. the cross barz K being placed horizontally in the axis; then fix the hinder disk W. on the agitator by means of the pinz or wedgez 7. close it by means of the hinge D of the movable part W. of the disk (8) then throw the before mentioned mixturez quickly into the cylinder.

This done remove such part of the mixturez as may remain behind the part of the disk N. by means of a broom, raise the part W. and place the [illegible] O. against the parts W and N. by this means the upper part W. will be firmly closed. During this time fill the groove 6 of the door of the cylinder and the opening [illegible] of the [illegible] with potterz earth mixed with hair to form a lute of a proper consistency at the same time the prolongation 8. of the agitator must be [illegible] into the stuffing Box and lute stuffed all round the agitor as far as O. On turning the door T. on its hingez the extending piece R. will be reached. There introduce the square end of the part H. of the agitator into the fork Q of the hinder part. place them so that the holez H. and 8. come opposite to each other; so as to pass the pin P. through them, which must be bent a little so that it may not fall out of these holez without force.

That done push the door against the extending piece R. pass a lever in the ringz U. of the collar A and force them so that the parts R. and T may be closely joined by means of the barz and pieces [illegible] B. in the form of the letter S, which pass underneath friction rollerz D. guided by the staples P. the projecting part V. enterz the groove 6. and lutez the entrance to the cylinder. Then introduce the wedgez L. of the stuffing box in the agitator 8. pass a lever in the ring U. of its collar [illegible] force the [illegible] or wedgez L. against the bottom O. of the stuffing box (previously coating with lute in the manner already described) these 2 parts of the different piecez. Put the [illegible] socket E. upon the agitator 8. raise the [illegible] piece A. of the support d (9) put the two pinz C. into the holez of the piecez a & d. place the key or pin 6. into the space between the thread of the screw E. and place the toothed wheel

8162X

G on the agitator. The teeth of that wheel entering those of the [illegible]
wheel F. then place the pin g into the hole made at the end of
the axis of the agitator; next turn the handle I, affixed upon
the axis of the wheel F) and thus continually stir up the ani-
mal and other substances submitted to calcination in the closed
cylinder (10). The gazeous products will be passed into
the first vessel of the Woulfe's apparatus, by means of the tube
P. and afterwards (by means of the tubes B.) into the other ves-
sels B. such of these gazeous substances as are condensable, i.e.
the empyreumatic oil and the ammoniacal gas will be condensed.
the carbonic and hydrogen gas will escape by the tube A.

When the agitator has been made to [illegible] or traverse or work
in the cylinder, by means of the screw: a distance between two of the
traverses or iron bars K. the workman who turns the handle I. must
pass to the other side of the agitator; and turn the handle in the
same way. by which means the agitator will be worked in the re-
verse direction of the first movement. when it arrives at the
same distance he must again pass to the other side. and proceed
thus. during the operation of calcining. but more quickly than
at the first turning, continue thus about one hour and then in-
much more quickly. and when he finds less resistance in the in-
terior of the cylinder. and that the movement is more easy (and
to this great attention must be paid) he must then turn very quick
for about 8 or ten minutes, for then the substances are in general
brought near to the desired state of calcination: a few minutes [illegible]
[illegible] he must open the aperture Q and if but
little smoke is apparent, then the calcination, it may then be sup-
posed, has arrived at its proper period.

Then immediately proceed to discharge the cylinder thus. take out
the pin g of the wheel G. at the same time taking out those of
the rolling [illegible] x. the support d. and the screw (if the sup-
ports are used under the carriage figure 21). Then remove the
carriage from underneath the extending pieces of the agitator

8162X

A of the [illegible] box, [illegible] the wedges I
take off the screw E. unfasten the collar, unfasten the collar A. of
the door and open it half way take out the pin P. which unites
the two parts of the agitator; open the door entirely and by means
of crooked pieces of iron (which must be passed into the handles
I of the disk) draw the agitator out of the cylinder quickly and let
the calcined matter fall into the conical moulds E of the carriage
figure 2 (11) placed under the extension of the cylinder K. in
withdrawing the agitator from the cylinder it must be held by the
hooks B. of the crane figure 3. The agitator being withdrawn
from the cylinder the little calcined matter which remains
adhering to it. must be removed by means of a brush formed
of small wires. and with a rake remove such of the calcined
matter from the cylinder as was not withdrawn by the front disk
I of the agitator. Take the carriage from under the extension
of the cylinder. and immediately recharge the cylinder as in
the first instance. A mixture of the described materials
should always be had in readiness for that purpose. The cal-
cined matter being cooled (12) convey it to the moistening vessel
figure 4. and when moistened as described in the specification
of my Patent of December 1822. put it into the funnel A. of
the boiler of the steam vessel Figure 5.

Charge the Boiler to about three feet of its height. and then ad-
mit water (or afterwards the weak solution in the reservoir) rais-
ed by the pump Figure 20. to within about one foot of the lid.

Things being thus disposed. fill the reservoir D to
about half its height with a mixture of one part of sulphu-
ric acid to ten parts of water. screw the bell E on the axis
G of the agitator, until the lower part of it is about two
inches from the bottom of the reservoir D. then place the tube
B with its cock open into the first vessel of the Woulfe's
apparatus. that is. into the first of two vessels placed at a
little distance from the Boiler figure 5. fill the first one to
about half its height, with a solution of the muriate of lime

8162X which we will suppose to be about 15 degrees of the areometer for
salts. and in the second vessel (left entirely open) put about
as much water (as in the neighbouring vessel), acidulated as
in vessel D. Fire must then be placed under the boiler and the
substances kept boiling, for about one hour and a half as before
prescribed, and during this time the matter in the boiler must
be continually stirred by means of a handle fixed on the axis
of one of the [illegible] wheels F. after this a linen cloth must be
spread over the grating A of the filterer figure 6. and be fasten
to the points I. and drawn tight against the padding I. the cock
C being closed ) Between the doors D & Z. tightly fastened by
the wedges B. the gutter placed underneath the filterer, and a
second linen cloth is put between them to receive the liquid which
may proceed from the sides and conduct it to the gutter, with
the limpid filtered liquid. The bucket or pail R. of the cock
R. being placed at the end of the pipe of the boiler and kept
there by means of the step S. shut the cock of the pipe B. open
the cocks V & R. taking care to stir the agitator P briskly du-
ring the time the liquid and its deposit runs on the filterer.
The liquid being drawn off to the height of the cock R. close
the cock, and recharge the boiler with fresh matter, and
proceed as in the first instance. When the liquid above the
cock C. of the filterer is clear let it run into the gutter by means
of a moveable pipe suspended underneath a cock by a cord, &
which pipe may be moved from one cock to another as required
The coloured substance is afterwards put and boiled in the boiler
figure 7. in the manner already described. and thrown into the filterer
figure 8. by means of the tube B. being sufficiently drained it is then
to be carried to the strainer figure 9. where it must be washed
(to obtain the [illegible] solutions of which mention has been made
for boiling the coloured substances) with hot water proceeding
from the case of the carriage figure 2. which water must be rais
ed up to the strainer by means of a pump or otherwise.

8162X

The prussiate waters of the two boilings of the calcined matter being brought into the common solution in the reservoir figure 10. by means of the pump of the reservoir figure 11. let it fall into the Boiler T. figure 1. by the cock C. and the pipe O.

The solution of the prussiate being concentrated in the Boiler until it forms a pellicle (see reference of my patent of the 14 December 1832) on the surface of the boiling liquid. open the cock in the pipe V. (which is to be about 4 inches diameter) and the solution will fall into the crystallizer figure 12.

When the prussiate is crystallized and the solution cooled. open the cock B. of the crystallizer figure 12. break the crystals opposite to the tube and the mother waters will flow. (that is to say. the solution of Carbonate of Potash) into the reservoir figure 13. after which the crystals are to be thrown on to the filterer figure 17. to be drained, and the solution conducted (by the pump belonging to the reservoir) to the boiler figure 14. for the purpose of being concentrated. When the calcined substances are sufficiently washed and drained in order to obtain the required weak waters close the registers Y and V. of one of the stoves figure 15. in order to direct the heat and smoke into the other stove.

Place the calcined substances on the hurdles F. of the first stove and when the required number of hurdles are placed in it. shut the door A, of which the projecting ledge I. will enter into the groove B. running all round and filled with sand. open the registers. and when the matter has become dry. shut them again and take out the hurdles.

Having concentrated the solution of Potash in the Boiler figure 14. &c. The [illegible] ined matter being dryed as hot as possible. it is to be carried to the vessel figure 16. placed close to the boiler 14. and mixed as it has been described in the first patent. The liquid must be added until the calcined matter becomes cool. and so on for succeeding operations.

For the second crystallization. the operation is done & suppose in the boiler figure 18. This will be afterwards discharged to the crystallizer Fig 19. NB. The nostrums referred to are those given in my Specifications - patented on the fourteenth December 1832. Equal parts of animal substances and of Potash to which a for-nigerous substance has previously been added.

In fact all the mixtures used in the manufacturing of pancreates may give the same advantageous result if treated in my cylinder and by my economical way of manufacturing.

Process of Desuing

The mode of freeing the wool in the fleece from its grease may be by the ordinary way, or by means of a strainer managed by a crane in which strainer the wool is freed from as much as possible from grease, drained and washed (14) after this operation fill another strainer loosely with the same wool and put it in bath No 1. (13.) Soon after the wool has been in this bath it should be raised, and lowered again and allowed to remain for 10 minutes, then be stirred about for a short time & raised again - If the operation is accomplished place the strainer or vessel containing the wool, on a stand or frame for ten minutes then turn it on the other side and leave it for 10 minutes more afterwards introduce it into the bath No 2. and treat the wool in the same manner, and during the same time as in No 1. or about.

The baths 1 & 2. will be found more serviceable and advantageous for wool which has been recently shorn from the animal and in all cases when the wool is in the fleece; because the wool worked into cloth has in general been fulled and therefore the baths 1 & 2 are considered as less necessary.

For common wool it may be only necessary to pass it into bath No 1 which will entirely destroy the pellicle that covers its roots and which pellicle prevents its imbibing the dye, when used in the ordinary way, or if it does imbibe it, the colour is soon destroyed and the cloth becomes white at the edges and seams - In this case without preliminary Desuing [illegible]

8162X washing, or even employing bath No 2) the wool may be put
into bath No 3 for dyeing as is the case when operating on
cloth or fulled wool, but the omitting of these operations is
not recommended as it will be much less perfect.
The baths 1 & 2 intended for blankets, cloths or stuffs may be formed in
the ordinary vessels used by dyers and the work conducted as in ordinary
cases upon reels, with the observation that all their parts be exactly pen-
etrated by the liquids as an inequality of shade would be the result of a defect
in this operation. Wool may also be put in a loose state into the vats.
Wool in the fleece passed into the baths No 1 & 2 and afterwards washed with
water will be free from all smell proceeding from the oil or grease which it
originally contained, whereas wool treated in the ordinary way however good
and complete may have been the means employed to clean and scour it,
will always preserve more or less that smell which it is desirable to get
rid of. General means of applying the mordant (15) or of fixing the
deutoxide of iron on cloths and other substances in general fit for dyeing by
the employment of protosalts of iron &c (16)
We will commence first with wool in the fleece, then with that in cloth
stuff or piece and afterwards with wool and all other matters or materials in
the skein. Besides the two principle methods of applying the mordants
described in my first patents, there are many others which can be resorted to,
as for example. 1st In producing a change in the protoxide on the wool
either when this change shall be simply produced by the decomposition of the
a part of the protosalt of iron when it comes in contact with the air,
or arising from decomposition of the salts, by conducting a current of hot air
to the wool to oxygenate the protosalts and to produce that oxygenation in
a prompt and equal manner on all parts of the mass of wool.
2nd On the number of [illegible] immersions of the wool in the baths 3rd on the
manner of preparing the baths on treating and maintaining them in a fit state
for subsequent use when applying the mordants and in so doing with celer-
ity and economy. 4th On the employment of the various machinery ves-
sels, utensils &c constructed for the divers operations of applying the mor-
dants when these vessels are arranged in a proper manner to carry on the

8162X

[illegible] with promptitude care and correctness. 5thly. The first method of the
first patent may be dispensed with; that is to say, that part which relates
to decomposition, and the operation of applying the mordant or the other
operations may be carried on as if the aid of this decomposition had been
resorted to &c. The wool having been prepared by the baths 1. & 2. and
[illegible] as already pointed out is to be put (for mordanting it by the first
method of the first patent) into the vessel or strainer; which vessel has
been previously placed in the bath No 3. The wool may be packed rather
close. When the quantity required is so placed, raise the vessel out of the bath
and lower it again almost immediately, repeat this operation a second time.
Then put the vessel on the frame. The wool thus placed (the vessel being turn
ed on its other side during that time) will be sufficiently drained in half
an hour (or at least that part which is in the upper part of the vessel)
to be put into the Bath No 4. The small quantity of wool which lies
at the bottom of the vessel should be squeezed or wrung before it is
put into that bath. The more the wool has been drained after its
last washing, before being put into bath No 3, the better, in fact if
it be quite dry it would be preferable, but in that case it imbibes the
water with greater difficulty, and care must then be taken not to put
so great a quantity into the vessel, as it would be necessary to stir it
about in order that it might be equally wetted in the bath.

For Bath No 4. the wool placed in the strainer is treated as
directed in the former specifications, and, after having remained there for
about ¼ of an hour take out the vessel and place it on the frame in an
inclined position (17) for about [illegible] minutes and then change its position
from 3 to four and vice versa in order to equalize the distribution
of the liquid upon the wool, which is to be spread afterwards on a
hot stove till the [illegible] is completed.

Being placed again in the strainer it is conveyed to bath 5. as
soon as it touches the liquid let it be lowered as quickly as possible to a
bout the middle of the depth of liquid where the wool may be turned over
with facility by means of sticks. after having remained in this bath for
about [illegible] minutes take out the vessel and place it on the frame, on

8162X to [illegible] before, because the wool will [illegible] in the
[illegible]. In this case it will not be necessary to introduce the
wool into the hot stove; but if, instead of putting it into the bath 5,
it should be determined to plunge it into the bath 4, as is done in
ordinary cases to fix or apply mordants by the second method of the
first specifications, it will be found convenient and advisable to pass
it a second time to the hot stove, and in the case of the latter mode
of applying the mordant, it will be well to apply that method of
exposition after each immersion. Two or [illegible] and com-
plete immersions should be made in the bath 5, without placing
the wool on the frame, except for a short time only after the last
immersion. In applying the mordants by the first method the order
of passing the wool into the baths may be changed if desired. [illegible]
[illegible] it into bath No 4 at 3 degrees of thermometer, then into bath
No 3 at 6 degrees, but at each immersion [illegible] of these fluids will
be [illegible], then of recourse be had to the method already pointed out
for the use of these baths. Bath No 6 to be used about the same
way as No 5. For bath No 7, the wool may be [illegible] into the
[illegible] placed in the vat to be withdrawn all at one time.
Washing will be very useful after this bath, and may also be needed
[illegible] after each one of the operations of mordanting which precede
it. Mode of applying the salts of copper as a mordant for fixing
the oxide of that metal on fibrous substances. [illegible]
[illegible] to be operated upon. I must add to the directions of the
first specifications, that; 1st It is desirable that the vessel in
which the bath 3 is formed with lime for example, should be as
deep as 3 or 4 times the length of the skeins, in order that a [illegible]
[illegible] of lime may always be contained in the vessels, and
that by a very little repose this excess may fall to the bottom and
remain there as a deposit. By this means the upper part of the li-
quid will be limpid when the skeins are plunged into it.
2nd Whatever may be the nature of any other material to be mor-
danted besides the vegetable ones in which you are operating, follows.

the same directions, but in general operating the first method with a
carbonated alkaline bath such as No 3 and by the second method
as for the other textile substances — 7th The last bath into which
the substances should be passed may be either 3 or 4. It will
be sufficient No 3 and whether the materials be washed or not af-
terwards in plenty of water (but I recommend washing) the ferrous
substances mordanted by the oxide, are to be placed into the proper
bath to ~~obtain~~ produce a black of such fixedness as to resist the
action of the air and washing 4th The oxides of iron and of copper may both be fixed on the
substances at the same time by means of the bath No 4. compo
sed of the salts of iron and of copper, or simply the operation
being performed with a bath of iron or a bath of copper as it will
be thought more convenient 5th For mordanting by the salts of copper the alkaline bath
No 3 may be resorted to, instead of the [illegible] alkaline caustic one,
especially if it is chosen to use a bath at the ordinary temperature.

The wool being now in a state ready to receive a green color, is
to be treated for fancy colors obtained from dye woods as in any
dye house. If it is intended for blue the oxide of iron must be
saturated by means of prussic acid as follows A requisite quantity being placed into a strainer immerse it per
fectly into bath No 8. withdraw the vessel quickly just above
the surface of the bath and let it immediately afterwards be
again lowered into it, repeating this several times and after this
immersions at intervals of 15 minutes, but the vessel need not
then be raised entirely out of the bath but only partly. This mode
of proceeding will cause sufficient agitation of the liquid to keep up
an equality in all parts of the bath. The wool being now in a blue
colored state the following baths from 9 to 11 are used only to give
more brilliancy darkness according to the blue and may be re-
sorted to in such combinations as will insure the better result
They may also be omitted. It is to be observed that, but No 15 is only a preliminary bath when [illegible] is requested.
Indigo itself may be employed before, during or after the coloration
of the oxide of iron by means of prussic acid, to give to it a peculiar
shade (22). The same may be said of many other substances which it
is unnecessary to enumerate here, as it will be apparent to the com-
petent operator. Observations and notes referred to:
The observations from one to 7 inclusively are intended to eluci-
dations of the articles on which my claims are founded. The num-
bers to be looked for in the explanations annexed with the plates, [illegible]
[illegible] in number deposited in the Patent Office.
1st The forms of the vessels are not obligatory: and they may be con-
structed of wood or of metal: except such of them as are intended
to contain acids, for which wood is preferable.
2nd After a process or operation is finished, the baths should be brought
into the states already indicated in speaking of their formation, be-
fore commencing another operation. By baths are understood, all
sorts of liquids, gas, vapor, or steam, to the action of which the
textile substances are exposed. All the baths should be heated by steam.
3rd The air may be heated by means of the hot stove bath or by
passing it through a cast iron cylinder, placed by the fire place, or
in a double chimney of a furnace, or by steam passed through a
double conductor or pipe, as indicated in the plates, or by any other
convenient mode. In all cases where a current of air is forced in
by a pair of bellows, they should be placed at such a distance from the
place where the heat proceeds, as will insure a perfect and a general
diffusion of air in the required places.
4th It is advisable that the stoves should be covered at their upper
parts and be surrounded with coarse woollen cloth. this will leave a
free passage for the humidity to pass without loosing much of the heat
which has been introduced; this will be found a very advantageous
mode, and superior to the ordinary fitting up of stoves, where the
humidity traverses various buildings and escapes through openings in
the roof, and where more heat than humidity passes off that way.

5th The gilding and [illegible] rollers may be made of different materials,
and in various manners, for example the [illegible] rollers [illegible] supported
[illegible] having [illegible] at each end, around which
rubber bags [illegible] and [illegible] must be tied with [illegible] thread
the [illegible] of [illegible] [illegible] should [illegible], the
[illegible] of [illegible] woollen cloth.
The [illegible] must be previously filled with small spherical
bodies, either of glass, lead or iron, and afterwards be attached
to the necks [illegible] at each end of the rollers [illegible] see reference 1st.
7th see reference 3rd [illegible] In the place of the disks, a disk may be
placed similar to that marked L which must not be fixed to the cylinder
until after it has been charged. 9th When it is required to render
the supports A H and their accessories movable, the carriage A
figure 12 must be employed, which carries its own supports on
its platform H. This carriage must be rolled on the rails, figure
and being B [illegible] affixed to the ground. This rolling piece [illegible] movable
and also its supports but when it is desired to render it fixed, &
to form it into only one piece with its [illegible]. The carriage ought to
be on the rails W
When the movable supports are not made use of, the agitator must be
sufficiently long from the stuffing box to the [illegible] in order to prevent
the fixed supports A H from hindering or interrupting the charging
and discharging of [illegible] &c.
10th The [illegible] of [illegible] the [illegible] in the cylinder may be em-
ployed without [illegible] the [illegible] only [illegible] produced to become
[illegible]. [illegible] the tube T [illegible] be conducted underneath
the fire place of the furnace in order that the [illegible] products may
be burnt, or the tube may be prolonged so that the [illegible] enters the
chimney [illegible]. [illegible] will be employed
for the [illegible] which produces any kind of [illegible] volatile
substances. 11th The [illegible] may be filled with cold or
hot [illegible] by means of the [illegible] figure 13 and placed under the [illegible]
[illegible] R the funnel [illegible] being removed after the cylinder has been

[illegible], the water must be drawn off from the [illegible] of the carriage by the cock C. and then be refilled with cold water before another calcination is ready, and again drawn off from the Coal. [illegible] the cocks R C. take hold of the Carriage at the parts I. by the hooks B. of the crane figure 3. and which carriage must be raised to a convenient height, and then be turned over, the Calcined matter will then fall out of the Cones E, and be from thence carried to the room figure [illegible] (or some other closed place) and be thrown through the swinging gate A. which is to be closed immediately after.

12th. Sufficiency of the former Specifications.

13th. Having shewn the composition of the baths in my former Specifications, I will refer to it, adding only that the bath alluded to must be in the described state, unless the contrary be stated. This observation may be understood for every bath that will be quoted hereafter. 14th. It is absolutely necessary that wools intended to be dyed should be well washed. The system hitherto and at present employed is very defective. for in many instances part of the wool, being crossed and pressed into small pellets, by the sticks usually employed in turning it over, becomes unfit to receive the dye, or receives it so imperfectly that different shades of color, are, very often, observable on withdrawing it from the baths. But the employment of the machine now invented, will most completely obviate this difficulty and disadvantage, independently of which a much greater quantity can be washed in the same given time, than can be done by any of the means now employed for that purpose. (see plate 3.)

The machine being placed in a current of water, put the wool on the [illegible] or roller L, then put the machine into regulated movement by means of the handle N. and the strap H. the wool will then fall into the water. the current of which will conduct it towards the spokes M. and thus successively from one spoke to another, until it be conducted towards the [illegible] V. which in consequence of the movement it receives from the roller T. put into motion by the strap S. will raise the wool (when washed) so that it may fall into the carriage or basket n.

The current of water in the machine can be regulated by a gate & be
at which the water flows from, if required, so that the wool may
be conveyed to & across the spikes with the required facility and quick-
ness in all cases regulating the depth of water under the machine
when it is in operation. The eccentric axle, the crank, the
double axes, and in fact all kinds of cams to be found susceptible
of giving or creating a rotary motion may be substituted in lieu of the
system of levers or triangle of this machine & placed above, below or
on the sides of the axes of the fluids marked G or M so as to cause
a regular backward and forward motion of that part of a circle which
acts on the spikes M which lay hold of the wool.

This machine may be constructed entirely of metal, or in part
of metal and in part of wood. When I speak of washing it
is always to be understood that this machine is used for that purpose.

15th. The operation of percolating or forcing the oxide of iron
upon the textile substances may be considered as a particular color
if the matter upon which you are operating is not intended to be
passed into bath No 8 or others.

16th. The deutoxide of iron may also be employed and will be
decomposed on the textile substances in the bath [illegible]. To equalize the
liquid it will be necessary after each immersion to place the vessel contain-
ing the wool in a frame or horse which might be placed across the vessel
containing the bath. The vessel should be placed on its side and be re-
versely turned over to the opposite side so that the liquid may per-
fectly [illegible] one side of the wool &c to the other and thus prevent an
irregularity of color and in order to avoid streaks and care should
be taken to prevent the wool sticking at the bottom or against
the sides of the vessel in the first immersion from remaining there
at the subsequent ones but it should rather be brought as near the
middle as possible by turning the vessel containing the wool as directed
and [illegible] [illegible] the front and when you are operating on a ro-
[illegible] the [illegible] [illegible] the position of the vessel from side to side as
from 3 to [illegible] [illegible] This operation of equalizing the liquid will be much more necessary after the baths No 3. 4. & 6. have been used, than when operating with the other baths. As regards the use of the latter bath No 6. it may be well to observe that the liquid should not only be well and equally distributed, but that the wool should be drained, as much as possible when it is put into bath No 7. If it is even dry so much the better. 22. The prussiate of iron may be fixed upon cloth or other substances, intended to be dyed black by various means, to give to them, what is practically termed a blue tint. It may be done by way of double decomposition, by using any of the alkaline prussiates which have been spoken of in the note of reference for bath No 8. or by saturating the oxide of iron in an acid bath formed with a soluble prussiate for instance, before or after producing black or other colors. The blue black, has hitherto been produced by indigo and it can be so done yet, with the application of the oxide of iron by my process. And again the double decomposition, in using the alkaline prussiate, in order to obtain the blue shade, can be obtained on applying the protoxide or deutoxide of iron by the process already in use.

Other Observations

All the component parts of the vessels, or utensils employed in the said baths should be varnished to defend them against the action of the acids, and the varnish be renewed from time to time.

Instead of using liquid ammonia in order to deepen the blue shade you may employ ammoniacal gas, more or less dry in the stove. In fact the ammonia may be introduced in such manner as promises the best results, and the same observation applies to the acid bath. The oxide of iron may be peroxigenated after bath No 4. without taking the wool out from the strainer by introducing a current of warm air into its interior as described in the plates and explanations enrolled with them.

The oxide of iron may also be applied by lixiviation (see the plates and explanations) after the mordant has remained about a quarter of an hour in the vessel let it out and when it is nearly run off introduce the current of warm air as above for 1/4 of an hour.

8162X

The [illegible] brighter in a lighter ground colour [illegible] taken
[illegible] Plate 5 & 6 [illegible] ordinary
[illegible]
[illegible] in the ordinary way
[illegible] with
[illegible] Plate No 4
by the first method [illegible] should be [illegible],
[illegible] possible.
[illegible] method
of applying the mordant to stuffs [illegible] in the [illegible] of the first
[illegible] plates and explanations [illegible] I shall only say that the op-
[illegible] pieces of
stuffs or cloths [illegible] being taken to keep
the baths constantly in a fit state.
For the method of applying the mordant to cotton wool, or
other substances [illegible] (see the plates and explanations) the baths
[illegible] the vari-
[illegible] For [illegible] the oxide of iron by
[illegible] stuffs &c. [illegible] the last fig-
[illegible] yellow (solid
[illegible] (see the plates and explanations). The operation
will be completed [illegible] The cloth may
be passed into the bath [illegible] following [illegible] and then be fulle-
[illegible] dyed i-
the fleece [illegible] fulled
[illegible] The oper-
[illegible]
[illegible]
[illegible] plates [illegible]
[illegible] when i-
[illegible]
[illegible] materia-
[illegible]

8162X

Observations on the baths — No 1. all the acids, except nitric acid
[illegible] is not required and some acid salts, as the salts of iron alumina &c.
are fit for this bath. — 2nd expose for some time ordinary soda spread
on a floor in a thin bed, taking care to stir it about and to take only the small
est parts for use. — 3d A bath composed of caustic ammonia would with
out indicating the same degree as the other alkalies, be alkaline enough for bath
3. — Caustic alkalies must be avoided as much as possible when operating
on animal substances, principally for bath No 3.

[illegible] This bath may be rendered neutral, before it is employed as well as
in the course of operation. This is done by an excess of the oxide of iron by
caustic or other alkalies or carbonates, but more particularly by the carbonate
of lime. — Here it may be necessary to remark as a thing of much impor-
tance and as establishing a test of clear distinction between my process
and those already known, or practised for fixing the oxide of iron, or for dye
ing with the [illegible] of iron, that by my process the baths and especial
ly No 4. are kept constantly neutral to produce the effect of fixing the ox
ide of iron in a more oxygenated state. Whereas by the other process, the
baths become more and more acid during the process of their use.

No 7th — Is prepared in a more than neutralized state with common soap
in solution of about 20 degrees of the Areometer for salts, 1/5 of which must
be decomposed by an acid. Then add to the solution, when about 167 to 212
degrees of Fahrenheit, a well carbonized alkali, for example, soda, the
alkaline principle of which represents about the one half of the same princi-
ple of which the soap is composed.

Another mode may be employed to neutralize this bath, viz. after having
added the alkaline carbonates boil the solution with a sufficient quantity of
Oil or grease to saturate the alkali so that after this saturation shall have
taken place, a very trifling excess of oil or grease may remain in the
bath. — Instead of employing soap rendered more than neutralized, or in ex
cess, with a caustic alkali, employ that which has been rendered so, with
an alkaline carbonate. — Instead of employing a saponaceous solution,
you may use the weak solution of an alkaline carbonate or of a caustic alkali
which must be boiled with some animal substance (waste woolen cloth or white

8162X

[illegible]
[illegible]
[illegible]
[illegible]
[illegible]
[illegible]
[illegible]
[illegible]
[illegible]
[illegible]
[illegible]
[illegible]
[illegible]
[illegible]
[illegible]
[illegible]
[illegible]
[illegible]
[illegible] No 13 [illegible] 14th [illegible]
[illegible]
[illegible] Bath No 14
15th [illegible]
[illegible] No 1[illegible]
[illegible]
[illegible]
[illegible]
[illegible]
[illegible]
[illegible]
[illegible]
[illegible]
[illegible]
[illegible]
[illegible]
[illegible]

8162X

[illegible] of the [illegible], but a [illegible] made with several pieces of [illegible] linen.
The pump may be supported by a staple or by other means, and be sufficient [illegible]
from the bottom of the reservoir to prevent its drawing off any portion
of the deposits which may be found there. — This deposit must be withdrawn
from time to time. The leading pipes of the pump [illegible] be placed sufficiently
high to allow the liquid to be conducted to the [illegible] vessels, by means of
pipes or channels, because the liquids can be transported much more quick-
ly and without the waste occasioned by transporting them by hand.
The reservoirs Figures 11. 13. 20. 27. and [illegible] figures 10. 12. 19. and 26.
should be about seven feet high — the first one being sunk in the ground about
[illegible] feet. — The manufactory should be flagged, especially near the cylinder. should
be washed often and kept clean. ———
Every practical man will readily perceive the difference between the common pro-
cess of dyeing Silks and Cotton by the [illegible] of [illegible] and the one described
in this [illegible] (being aware of the entirely different nature and properties
of the [illegible], and of the [illegible] of [illegible]) and understand why a process
that succeeds tolerably well on these two materials, does not answer on wool
that must be submitted to so many trying operations in order to its being trans-
formed into cloth. ——— Although working precisely by the means indicated
is not obligatory, yet experience has taught me that the more literally they
are followed, either for the composition of baths, their degree of saturation,
and their degree of temperature; the construction of machinery described in
the plates and its arrangement and employment, the more advantageous will
be the results [illegible]. — But I do not mean to say that, by new combina-
tions of the [illegible] or apparatus, [illegible] improvements cannot be obtained.
It is one of the advantages of the new principles to open, to investigation
an almost unbounded field, not only as regards the fixation of [illegible]
[illegible], But also for the obtaining of new colors by [illegible] too numer-
ous to be [illegible] here. — I shall mention here but one example to show
how these improvements may be extended without [illegible] the application
[illegible] of [illegible]. ——— Two processes of wool dyeing are known
the one in the fleece, the other in the piece — by my process I can produce
cloth dyed in the piece, that will exhibit all the characters of having been

8162X

[illegible]

[illegible] the [illegible] pe
[illegible] the
[illegible] cloth
[illegible] the ordi
[illegible] ordinary
[illegible] and
[illegible] are
[illegible] being
[illegible]
[illegible] entitled
[illegible] the four
[illegible] December
1832 [illegible] as
[illegible] blocks [illegible] are
[illegible] in
the [illegible] sufficient
[illegible]
Philadelphia December 27 1833

Witness
[illegible] Dorsey
[illegible]
Drawings
[illegible]